(12) United States Patent
Carr et al.

(10) Patent No.: US 7,165,410 B2
(45) Date of Patent: Jan. 23, 2007

(54) EVAPORATIVE COOLER DRAIN PUMP

(75) Inventors: Sheldon Carr, West Bend, WI (US);
Larry Hansen, Green Bay, WI (US);
Gary S. Jouas, Peoria, AZ (US)

(73) Assignee: AdobeAir, Inc., Phoenix, AZ (US)

( * ) Notice: Subject to any disclaimer, the term of this patent is extended or adjusted under 35 U.S.C. 154(b) by 196 days.

(21) Appl. No.: 10/945,857

(22) Filed: Sep. 21, 2004

(65) Prior Publication Data

US 2005/0166615 A1    Aug. 4, 2005

Related U.S. Application Data

(60) Provisional application No. 60/505,356, filed on Sep. 22, 2003.

(51) Int. Cl.
*F28C 1/00* (2006.01)
(52) U.S. Cl. .......................... 62/121; 62/171
(58) Field of Classification Search ............... 62/91, 62/121, 171, 304, 309, 310, 259.4; 261/152, 261/153; 417/15, 305
See application file for complete search history.

(56) References Cited

U.S. PATENT DOCUMENTS

| | | | | |
|---|---|---|---|---|
| 3,191,667 A | * | 6/1965 | Lorenz | 165/220 |
| 3,965,690 A | * | 6/1976 | Berryhill | 62/121 |
| 4,182,131 A | * | 1/1980 | Marshall et al. | 62/91 |
| 4,475,356 A | * | 10/1984 | Lewis | 62/183 |
| 4,615,182 A | * | 10/1986 | Worthington | 62/310 |
| 5,974,822 A | * | 11/1999 | Kopko | 62/310 |
| 5,988,264 A | * | 11/1999 | Goldsmith | 165/48.1 |
| 6,293,121 B1 | * | 9/2001 | Labrador | 62/304 |
| 6,418,728 B1 | * | 7/2002 | Monroe | 62/3.2 |
| 6,432,367 B1 | * | 8/2002 | Munk | 422/171 |
| 6,681,584 B1 | * | 1/2004 | Conner | 62/171 |
| 6,820,439 B1 | * | 11/2004 | Marek | 62/259.4 |

FOREIGN PATENT DOCUMENTS

JP        11-94986 A  *  4/1999

\* cited by examiner

*Primary Examiner*—Mohammad M. Ali
(74) *Attorney, Agent, or Firm*—Foley & Lardner LLP

(57) ABSTRACT

A drain pump assembly is provided for use with an evaporative cooler having a water reservoir and a circulating pump. The drain pump assembly includes a drain pump operative to pump accumulated water from the reservoir when the drain pump is turned on and a controller. The controller is operative to turn on the drain pump automatically after the circulating pump has operated for a predetermined circulate time period and also is operative to turn on the drain pump in response to actuation of a manual drain actuator. The controller turns on the drain pump for a drain time that is equal to or greater than a predetermined drain period. The controller can terminate operation of the drain pump and reset the drain time is power to the circulating pump is interrupted during operation of the circulating pump. The controller includes a processor and a data storage device operative to store data representing the accumulated circulate time when power to the circulating pump is interrupted. The processor is programmed to calculate an accumulated circulate time during which power is applied to the circulate pump; control the switch to operate the drain pump for a predefined drain period when the accumulated circulate time is equal to or greater than the predefined circulate period; monitor the actuation of the manual drain actuator; control the switch to operate the drain pump for the drain period in response to actuation of the manual drain actuator; and reset the drain time if power is removed from the drain pump during the drain pump operation.

25 Claims, 5 Drawing Sheets

EVAPORATIVE COOLER DRAIN PUMP

CROSS-REFERENCE TO RELATED PATENT APPLICATIONS

This application is an application claiming the benefit under 35 U.S.C. § 119(e) of U.S. Application Ser. No. 60/505,356, filed Sep. 22, 2003, hereby incorporated by reference in its entirety.

BACKGROUND OF THE INVENTION

This invention relates generally to evaporative coolers. More particularly, it relates to an evaporative cooler drain pump to drain the evaporative cooler water reservoir, a controller that provides for improved performance of such a drain pump, and an evaporative cooler that employs such a drain pump.

Evaporative coolers are well known in the art and have enjoyed substantial favor over the years as devices for cooling and conditioning enclosed spaces in hot, arid regions such as the southwestern portion of the United States. Such coolers rely upon the principle that dry air forced through a medium that is wetted with water releases heat to evaporate some of that water, producing a stream of cooler, more humid air. Typically, the wetted media comprise cooling pads made of fibers of aspen or paperbased, fabricated material. As an alternative cooling system to refrigeration air conditioning, evaporative coolers consume much less energy and, as a result, have been the subject of interest in offsetting increasing costs of electrical energy associated with running an air conditioning system.

As is well known in the art, evaporative coolers typically use rotary or centrifugal blowers to draw ambient air through one or more wetted pads, delivering the evaporatively cooled air either directly or through a ducting system to the cooled space. The pads are typically wetted using a water distribution system that employs a recirculating pump for pumping water from a water reservoir, typically located in the bottom of the cooler, through hose or tubing to the pads. The water that is not evaporated from the pads during the evaporative cooling process is routed back to the water reservoir where it becomes available to be recirculated to the pads once again. As water from the system is lost to evaporation, it is typically replenished using a float valve or similar device connected to a water supply to deliver fresh water to the water reservoir.

As this evaporation occurs, the salts and minerals dissolved in the fresh water supply remain behind in the water distribution system and are recirculated from the reservoir over the pads and back to the reservoir. Additionally, dust and other particulates that may come in contact with the wetted pads tend to be washed into the water reservoir by the water flowing over and through the pads and become trapped in the water that is recirculated within the evaporative cooler. The result is a continuously increasing concentration of dissolved minerals and suspended solids and a continuously increasing salinity in the water used to wet the cooler pads. This increase in particulates, dissolved solids, and salinity results in the build-up of mineral deposits and scale on the evaporative cooler pads, the frames holding the pads, the recirculating pump, and other parts of the cooler. This scale build-up reduces the cooling efficiency of the evaporative cooler and shortens the operating lifetime of the recirculating pump, blower motor and cooler housing.

In order to slow the increase of dissolved solids, salts and other contaminants in the water used by evaporative coolers, a bleed system has been employed. This system continuously routes a small portion of the recirculated water to the drain of the cooler. Fresh water is continually added to the water distribution system to replenish the water that has been bled from the cooler. The addition of the fresh water to the water reservoir dilutes the concentration of salts and minerals in the cooler water. This method, however, wastes a substantial amount of water and is very undesirable. Alternatively, periodic maintenance whereby the water reservoir is manually drained via the reservoir drain has also been an approach used to maintain efficient cooler operation. This technique, however, is time-consuming and dirty for the person performing the draining, and is prone to being overlooked.

More recently, evaporative cooler manufacturers have employed a drain pump to periodically pump water from the water reservoir to the cooler drain, substantially removing the water containing dissolved solids and other contaminants from the water reservoir and allowing fresh water to replace the expelled water by way of the cooler's fresh water supply. U.S. Pat. Nos. 5,527,157 and 6,134,905 to Collins, et al., disclose such a system. The drain pump is a second pump present in the water reservoir and is controlled by an electromechanical timer. This timer monitors the amount of time the recirculation pump operates, and, after a pre-defined period of operation of the recirculation pump, activates the drain pump for a second pre-defined period of time, effectively replenishing the cooler water supply with fresh water as previously described. Typically, the timer that controls the drain pump operation measures six to ten hours of recirculation pump operation before activating the drain pump for a period of four to eight minutes.

Because these previous drain pump systems use electromechanical timers, they are subject to reliability issues and relatively higher manufacturing costs that are associated with mechanical timers. Also with these systems, problems arise during the installation and maintenance of the drain pump and timer system. In order to facilitate the testing of the drain pump during installation, the drain pump timer may be preset to the start of the drain cycle so that, upon the application of power to the drain pump, the draining action commences, verifying correct and proper installation to the installer. Configuring this preset condition is difficult, time-consuming, and expensive for the manufacturer. Many times, even if the manufacturer has preset the timer to begin the drain cycle upon application of power to the drain pump, the installer is not present at the cooler when power is applied to the drain pump. The installer is quite often inside the house or other area to be cooled when power is applied to the drain pump. The draining action is not witnessed by the installer, and verification of proper installation does not occur. Once the drain cycle has elapsed, the installer must wait for an extended period of time (the six to ten hour cycle) or leave and return to try to catch the drain cycle in progress. This is simply not practical. Additionally, anyone performing periodic maintenance on the evaporative cooler must be present at the drain pump during the drain cycle to verify the draining action, an inconvenient proposition at best.

Another problem that exists with prior drain pump systems is that they waste water because they drain the water reservoir twice if power to the drain pump is interrupted during the drain cycle. This results because the drain pump timer is powered from the same source as the recirculating pump, so that power is applied to the timer when power is applied to the recirculating pump. If the power to the recirculating pump is removed during the drain cycle, the drain cycle is interrupted. This can occur when the thermostat or other evaporative cooler controller shuts the cooler off during normal operation, or it can occur as a result of a general power outage at the cooler's location. Once the power is re-applied to the recirculating pump, the drain cycle will resume, even if the water reservoir was substantially drained prior to the power being removed from the recirculating pump. This results in an undesirable waste of water.

In view of the above discussion, there exists a need in the art for an apparatus and method that provides for improved draining of in an evaporative cooler. Accordingly, it is an object of the present invention to provide such an apparatus and method.

Another object of the invention is to provide such an apparatus and method that provides for manual activation of the drain cycle in an evaporative cooler.

Still another object of the invention is to provide such an apparatus and method that provides for an efficient usage of water in an evaporative cooler.

Yet another object of the invention is to provide such an apparatus that is suitable for use with evaporative coolers of various types.

Another object of the invention is to provide such an apparatus that is easily and inexpensively manufactured, easy to install and test and is reliable.

Additional objects and advantages of the invention will be set forth in the description that follows, and in part will be apparent from the description, or may be learned by practice of the invention. The objects and advantages of the invention may be realized and obtained by the instrumentalities and combinations pointed out in the appended claims.

SUMMARY OF THE INVENTION

In accordance with the invention, there is provided drain pump assembly for use with an evaporative cooler having a water reservoir and a circulating pump and a method for controlling an evaporative cooler drain pump. The drain pump assembly includes a drain pump operative to pump accumulated water from the reservoir when the drain pump is turned on and a controller. The controller is operative to turn on the drain pump automatically after the circulating pump has operated for a predetermined circulate period and also is operative to turn on the drain pump in response to actuation of a manual drain actuator. Preferably the manual actuator is disposed on the exterior of a drain pump assembly housing that encloses the drain pump assembly, thereby providing easy access. The controller turns on the drain pump for a drain time that is equal to or greater than a predetermined drain period. The controller can terminate operation of the drain pump and reset the drain time if power to the circulating pump is interrupted during operation of the circulating pump.

In a presently preferred embodiment, the controller includes a processor and a data storage device operative to store data representing the accumulated circulate time when power to the circulating pump is interrupted. The processor is programmed to calculate the accumulated circulate time during which power is applied to the circulate pump; control the switch to operate the drain pump for a predefined drain period when the accumulated circulate time is equal to or greater than the predefined circulate period; monitor the actuation of the manual drain actuator; control the switch to operate the drain pump for the drain period in response to actuation of the manual drain actuator; and reset the drain cycle if power is removed from the drain pump during the drain pump operation.

The data storage device preferably includes non-volatile memory. Alternatively, it can have a power supply for operating the data storage device when power to the circulating pump is interrupted. Preferably, the drain pump assembly has a power interface operative to simultaneously energize the drain pump assembly, the drain pump and the circulating pump. The drain pump assembly can include a power converter operative to convert AC power to DC power to energize the controller. In one embodiment, the power interface includes an AC electrical plug connector having an integrally formed electrical receptacle.

BRIEF DESCRIPTION OF THE DRAWINGS

The accompanying drawings, which are incorporated in and constitute a part of the specification, illustrate the presently preferred embodiments and methods of the invention and together with the general description given above and the detailed description of the preferred embodiments and methods given below, serve to explain the principles of the invention.

DETAILED DESCRIPTION OF THE PREFERRED EMBODIMENTS

Reference will now be made in more detail to the presently preferred embodiments and methods of the present invention as illustrated in the accompanying drawings, in which like numerals refer to like parts throughout the several views.

Figure 1:
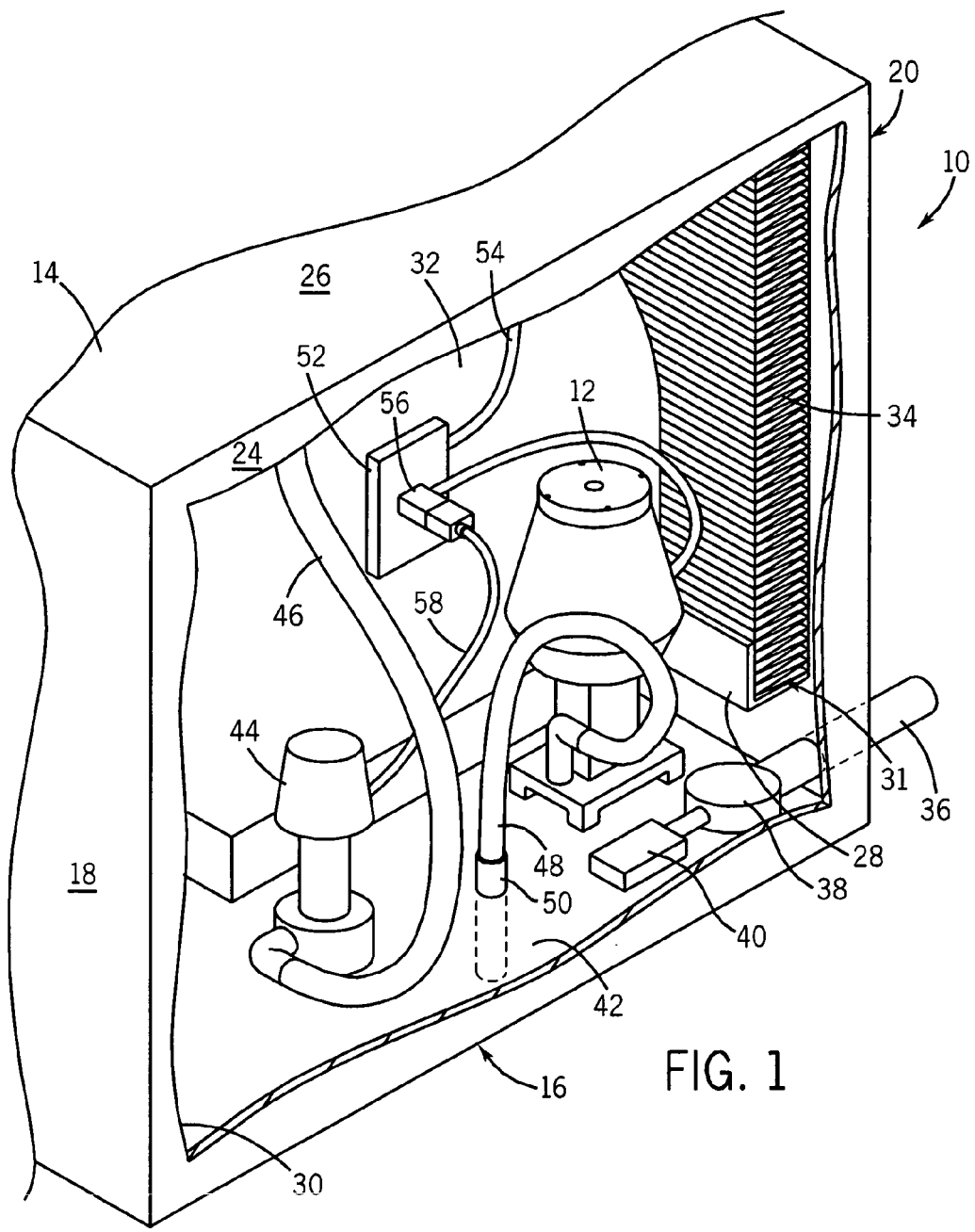
FIG. 1 shows a partially broken perspective view of one embodiment of an evaporative cooler utilizing a drain pump in accordance with the invention.

FIG. 1 shows a partially broken perspective view of a typical downdraft evaporative cooler 10 utilizing a drain pump assembly 12 in accordance with the present invention. An evaporative cooler housing 14 has a bottom wall 16, a right side walls 18, a left side wall 20, a back wall (not shown), a front wall 24, and a top wall 26. Any or all of the various walls may include openings into which evaporative medium panels can be disposed in any of a variety of manners, as is well known in the art, for holding an evaporative cooler medium 34 to be wetted. In FIG. 1, such openings 30, 31 are shown in the front wall 24 and the side wall 20, respectively. The front opening 30 is shown without an evaporative medium panel (i.e. the panel is removed) and the side opening 31 is shown with an evaporative medium panel 28 in place. A blower housing 32 is disposed within the cooler housing 14 and contains a blower (not shown). The blower produces an air flow, which flows from the outside of the cooler housing 14 through the openings 30, 31 and the evaporative medium to the inside of the cooler housing 14, thereby cooling the air via an evaporative cooling process. The cooled airflow is then is directed out of the cooler to the space to be cooled. The evaporative medium 34 is secured by the panel 28 to cover the side opening 30 so that the airflow produced by the blower travels through the evaporative medium 34.

As will be apparent to those of ordinary skill in the art, the invention is not limited to use with an evaporative cooler of the downdraft type, as shown in FIG. 1. Rather, the evaporative cooler may be any of a variety of configurations known in the art. For example, the cooler may be a side draft version in which the conditioned air exhausts out the side of the cooler rather than the bottom. To name just/a few other configurations, the evaporative cooler may be of singular or multiple pad design or may be portable or fixed in nature. The evaporative cooler may be constructed of any of a variety of rugged, weather-resistant materials well known in the art, including epoxycoated or water-resistant painted metal, or high-impact plastic.

Referring again to FIG. 1, water is supplied to the evaporative cooler 10 via a water input pipe 36, which extends through the side wall 20 and is connected in a manner well known in the art to a valve 38. The valve 38 provides water to the cooler housing 14 under the control of a water level sensing device 40. A water reservoir 42 contains the water supplied by the water input pipe 36, the valve 38, and the level sensing device 40. The formation of the water reservoir 42 is well known in the art and may be accomplished using a wide range of techniques. As the water level within the water reservoir 42 decreases, the valve 38, under control of the level sensing device 40, provides water to the water reservoir 42 and maintains a substantially constant level of water within the reservoir 42, as is well known and practiced in the art.

As shown in FIG. 1, the drain pump assembly 12 is positioned in the interior of the evaporative cooler housing 14 to pump water from the reservoir 42. The drain pump assembly 12 includes a pump mechanism that is in fluid communication with a drain conduit 48. The drain conduit 48 extends to an overflow pipe 50, which is secured to and extends through the cooler bottom wall 16 in any of a variety of ways well known in the art. In this configuration, water pumped by the drain pump assembly 12 exits the housing 14 via the drain conduit 48 and overflow pipe 50.

A circulating pump 44 also is positioned in the interior of the evaporative cooler housing 14 to pump water from the reservoir 42. The circulating pump 44 can be any of a wide variety of pumps suitable for pumping water from the reservoir 42. Such pumps and their operation are well known in the art. A water conduit 46 extends upwardly from the circulating pump 44 to a water distribution system (not shown) through which the pumped water travels to the top of the evaporative cooler panel 28. The panel 28 distributes the water over the evaporative cooler medium 34, and the water flows downwardly through and over the medium 34. Water that is not evaporated in the evaporative cooling process drains from the evaporative cooling medium 34 and the evaporative cooler panel 28, accumulating in the water reservoir 42 to be circulated again.

The drain pump 12 and the circulating pump 44 are energized by an electrical power source. As illustrated in FIG. 1, a presently preferred embodiment uses an electrical outlet 52, which is energized via an electrical conductor 54. The conductor 54 extends from the exterior of the cooler housing 14 to the outlet 52. The electrical outlet 52 is positioned within and secured to the cooler housing 14 and is connected to the pump power source (not shown) via the electrical conductor 54 using techniques well known in the art. A power interface 56 electrically couples the outlet 52 to a power input for the drain pump assembly 12, thereby providing the power for operation of the drain pump. A power cord and plug combination 58 electrically couples the circulating pump 44 to the outlet 52. In a presently preferred embodiment, the cord portion of the power cord and plug combination 58 extends from the circulating pump 44 and couples to the outlet 52 via the power interface 56.

Figure 2:
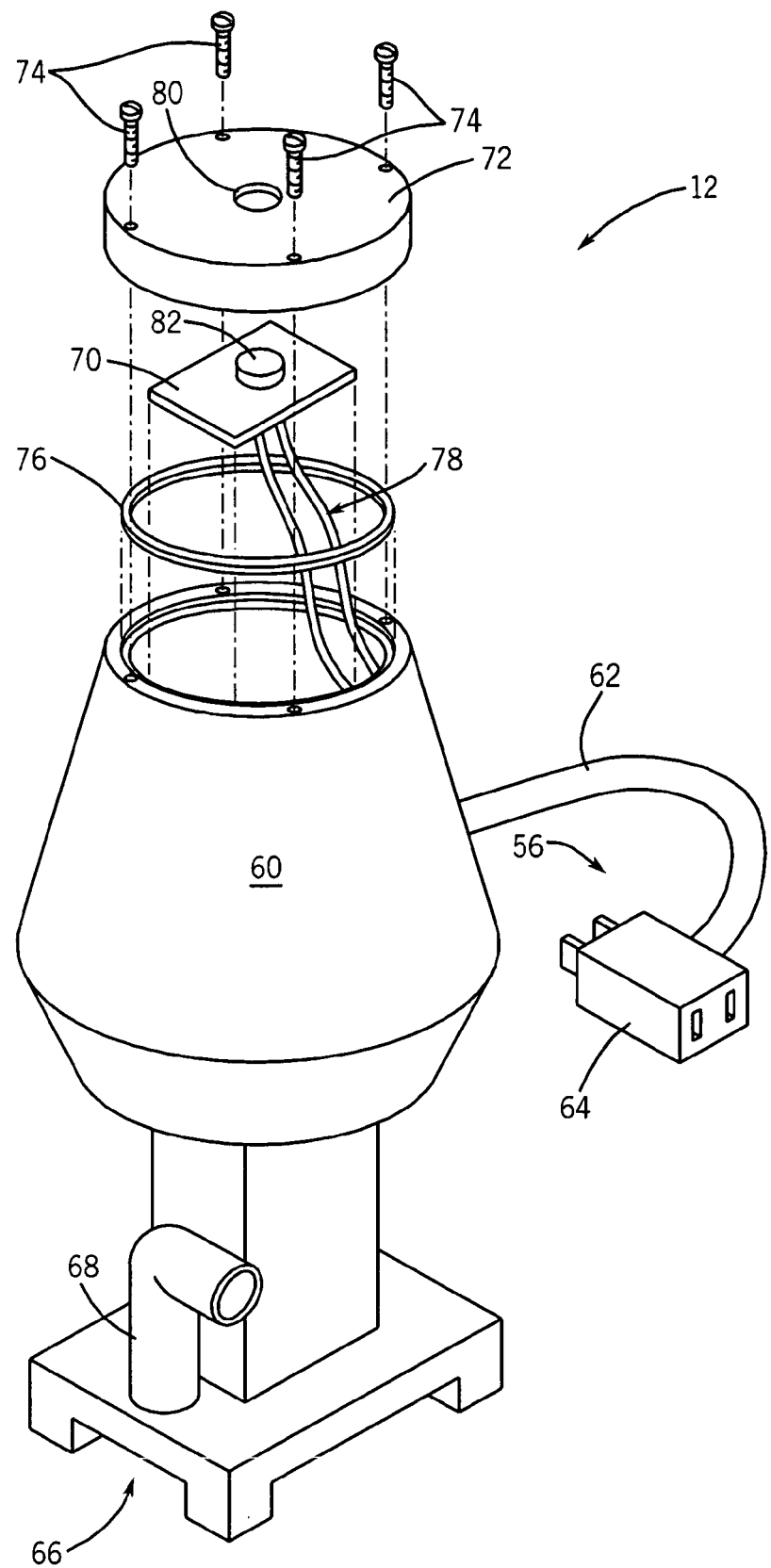
FIG. 2 shows a partially exploded view of the presently preferred embodiment of the drain pump utilized in the evaporative cooler of FIG. 1.

FIG. 2 shows a partially exploded view of the drain pump assembly 12. The assembly includes a housing 60 that encloses the pumping mechanism (including a motor), which can be of any type known in the art that is suitable for pumping water from the reservoir 42. The power interface 56 extends from the drain pump assembly 12 and comprises a power cord 62 and a combination plug and receptacle 64. The combination plug and receptacle 64 provide for the electrical connection of the drain pump assembly 12 to the outlet 52 via the plug end of combination plug and receptacle 64. The receptacle end of the combination plug and receptacle 64 accepts the power cord and plug 58 extending from the circulating pump 44. In this configuration, both the drain pump assembly 12 and the circulating pump 44 are simultaneously energized using one outlet 52 as illustrated in FIG. 1.

Referring again to FIG. 2, the pumping mechanism of the drain pump assembly 12 is in upstream fluid communication with a pump inlet 66 and in downstream fluid communication with a discharge port 68. The pumping mechanism operates in a manner well known in the art to pump water from the pump inlet 66 and discharge it via the discharge port 68. A controller 70 is disposed within a space in the pump housing 60. A cover 72 is secured to the drain pump housing 60 with screws 74 to enclose the controller 70 within the drain pump housing 60. A molded silicone gasket 76 provides a sealing engagement between the cover 72 and drain pump housing 60, thereby protecting the controller 70 from the harsh environment that is present the interior of an evaporative cooler. It should be noted, that a variety of other techniques may be used to secure the cover 72 to the drain pump housing 60 and provide the protective seal. These could include, for example, the use of sealant or epoxy. The controller 70 is appropriately electrically connected to the pump motor located within the drain pump housing 60 and to the power interface 56 via electrically conductive wires 78.

A manual drain actuator 80 is disposed on the exterior of the cover 72. The manual actuator 80 is suitably sealed to protect the controller 70 from the harsh environment in the interior of the evaporative cooler. In a presently preferred embodiment, the actuator is a membrane-covered pushbutton that provides an environmental barrier to moisture. Other suitable sealed actuators are well known in the art. A manual drain sensor 82 is positioned such that, when the controller 70 is assembled with the drain pump housing 60 and the cover 72, the manual drain sensor 82 is in sensory communication with the manual drain actuator 80. In a presently preferred embodiment, a normally open pushbutton switch is employed as the manual drain sensor 82. A variety of other suitable manual actuator/sensor combinations are available and are well known in the art.

Figure 3:
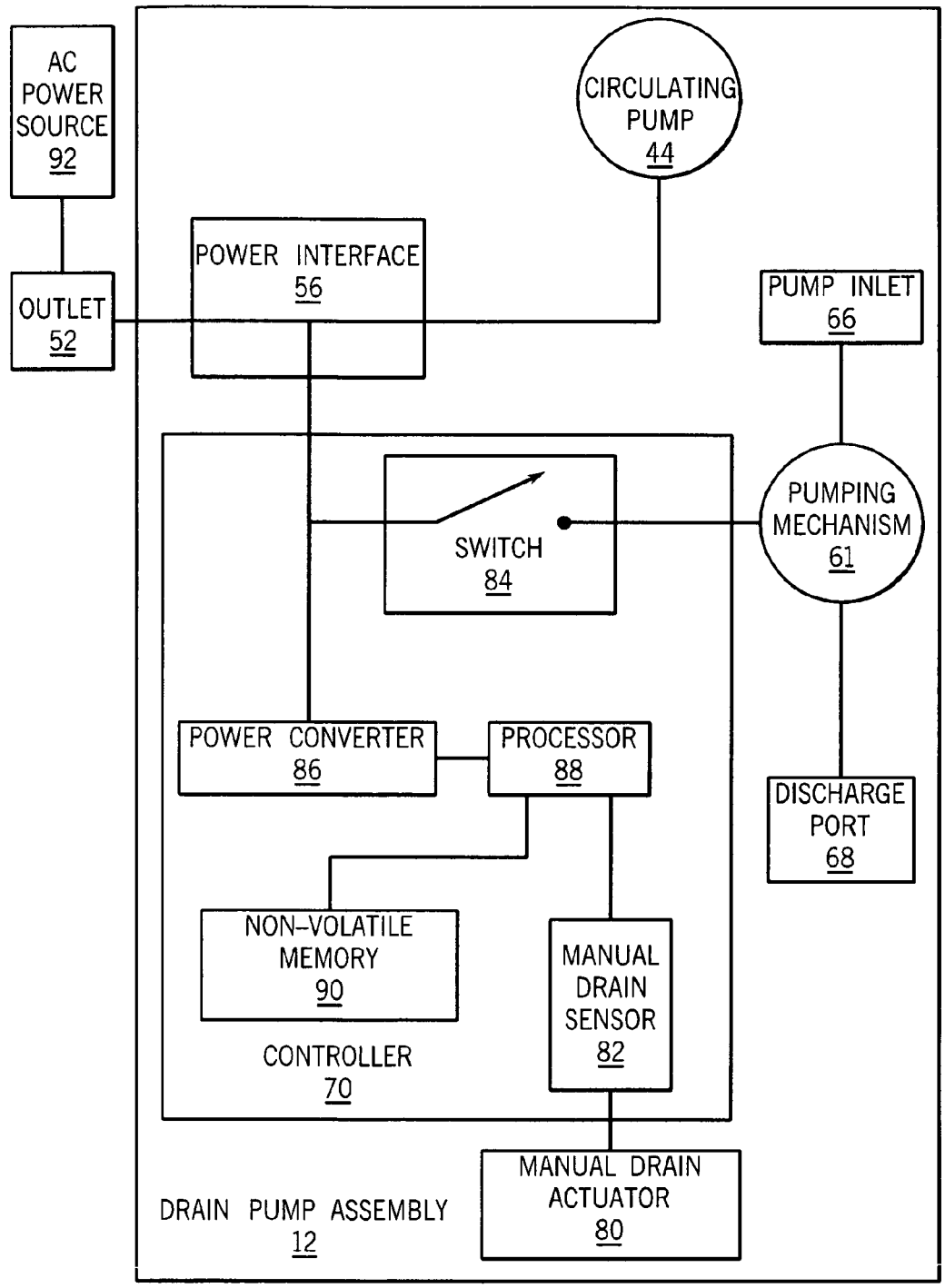
FIG. 3 shows a functional block diagram of the drain pump FIG. 2.

FIG. 3 depicts a functional block diagram of the drain pump assembly 12 and its relationship with the circulating pump 44. The drain pump assembly 12 includes the pumping mechanism 61, the manual drain actuator 80, the controller 70, and the power interface 56. An AC power source 92 provides AC power via the power outlet 52, and the power interface 56 routes the AC power to energize the circulate pump 44 as well as the controller 70, as previously described. As explained previously, the presently preferred embodiment of the power interface uses the combination plug and receptacle 64. It will be understood, however, that any electrical connectivity scheme that simultaneously supplies power to the circulate pump 44 and the drain pump assembly 12 may be used. For example in an alternate embodiment, the circulating pump 44 and the drain pump assembly 12 may each employ a standard power plug to derive power from a dual outlet with both sections of the dual outlet energized when operation of the circulating pump 44 is desired.

Figure 4:
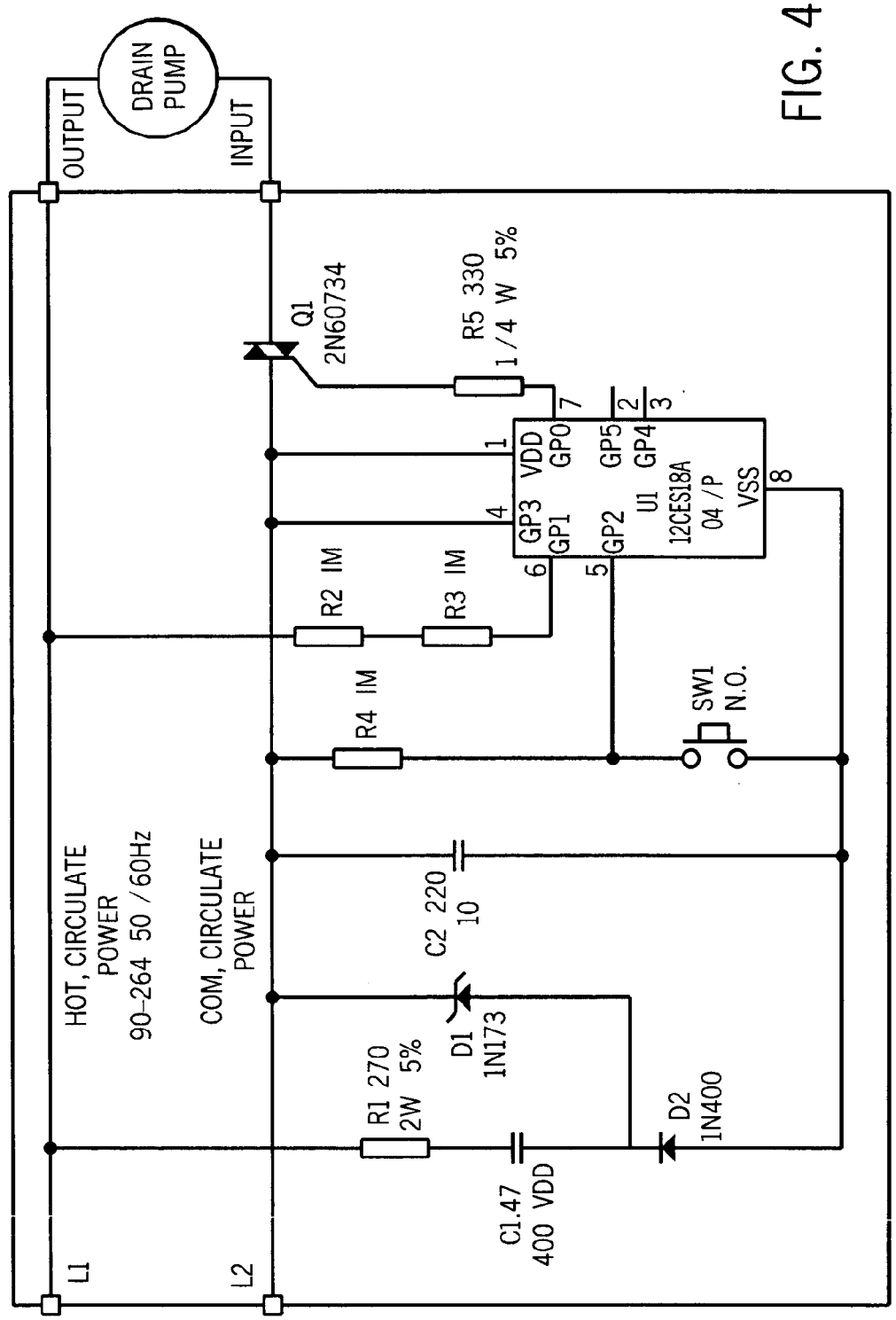
FIG. 4 shows a schematic diagram of a presently preferred embodiment of the drain pump controller in accordance with the invention.

As shown in FIG. 3, the controller 70 has a switch 84, a power converter 86, the manual drain sensor 82, a processor 88, and a data storage device 90. The power converter 86 receives an AC power input via the power interface 56 and converts this AC power input into a DC power output suitable for energizing the processor 88 and the data storage device 90. FIG. 4 shows a schematic diagram of a presently preferred circuit for implementing the controller, including the AC/DC power converter. Such power converters are well known in the art, and it will be understood that a wide variety of embodiments of the power converter can be employed to provide DC power to the controller 70. The switch 84 applies AC power to the drain pumping mechanism 61 in response to a control signal output from the processor 88. In this configuration, when the processor closes the switch 84 it turns on the drain pumping mechanism 61 to substantially drain the water reservoir 42. As shown in FIG. 4, in a presently preferred embodiment, the switch 84 is implemented using a triac, appropriately sized for the drain pump 61 to apply the AC "common" signal to the drain pump 61 in response to the control signal from the processor 88. Switching devices are well known in the art, and it will be understood that any of a variety of such devices and configurations can be employed to provide AC power to the drain pumping mechanism 61 in response to the control signal.

The manual drain sensor 82 is in sensory communication with the manual drain actuator 80 so that it senses when the actuator 80 has been activated. When the actuator 80 is activated, the manual drain sensor 82 provides an output signal to the processor 88, which then outputs a control signal to close the switch 84 thereby providing AC power to turn on the drain pump 61. By way of illustration, when a pushbutton is used as the manual drain actuator 80, the operator simply depresses the button, which in turn actuates the manual drain sensor 82 on the controller 70 and provides an input to the processor 88. Thus, one who is installing or maintaining the system can manually operate the drain pump 61 to test its operation.

In addition to being responsive to the output signal from the manual drain sensor 82, the processor 88 monitors the status of AC power supplied to the circulating pump 44 and the drain pump 61. As discussed above, the power converter 84 provides a DC power signal to power the processor 88. The processor 88 senses this DC power signal to determine the status of AC power, i.e. whether AC power is present at the power interface 56. The processor 88 is in communication with the data storage device 90 via a read and write interface and causes the data storage device 90 to retain the state of the logical operation of the processor 88 when the power is removed from the drain pump assembly 12. In a presently preferred embodiment, the data storage device 90 includes non-volatile memory, and the processor 88 and the non-volatile memory are integrated in a single microcontroller. The non-volatile memory is in the form of electronically erasable programmable read-only memory (EEPROM). One suitable device for implementing the processor 88 and the data storage device 90 is the 12CE518A microcontroller, manufactured by Microchip Technology Incorporated of Chandler, Ariz. It should be noted, however, that any of a variety of microcontrollers and similar devices are well known in the art and may be used to embody the processor. Similarly, the data storage device 90 may be implemented using a variety of commercially available non-volatile memory devices. It also will be understood that other embodiments of the data storage device 90 may be used. For example, the data storage device 90 may take the form of a battery that provides a DC power source to maintain the state of the processor 88 when the AC power 92 is removed from the drain pump assembly 12.

In a presently preferred embodiment, a small printed circuit board (PCB) is utilized to mount and interconnect the electronic components that comprise the drain pump controller 70. This method of assembly, in combination with the characteristics of the solid state components used for the controller 88, results in a drain pump assembly 12 that exhibits improved reliability and significantly lower manufacturing costs than the electromechanical timers of prior drain pump controllers.

Figure 5:
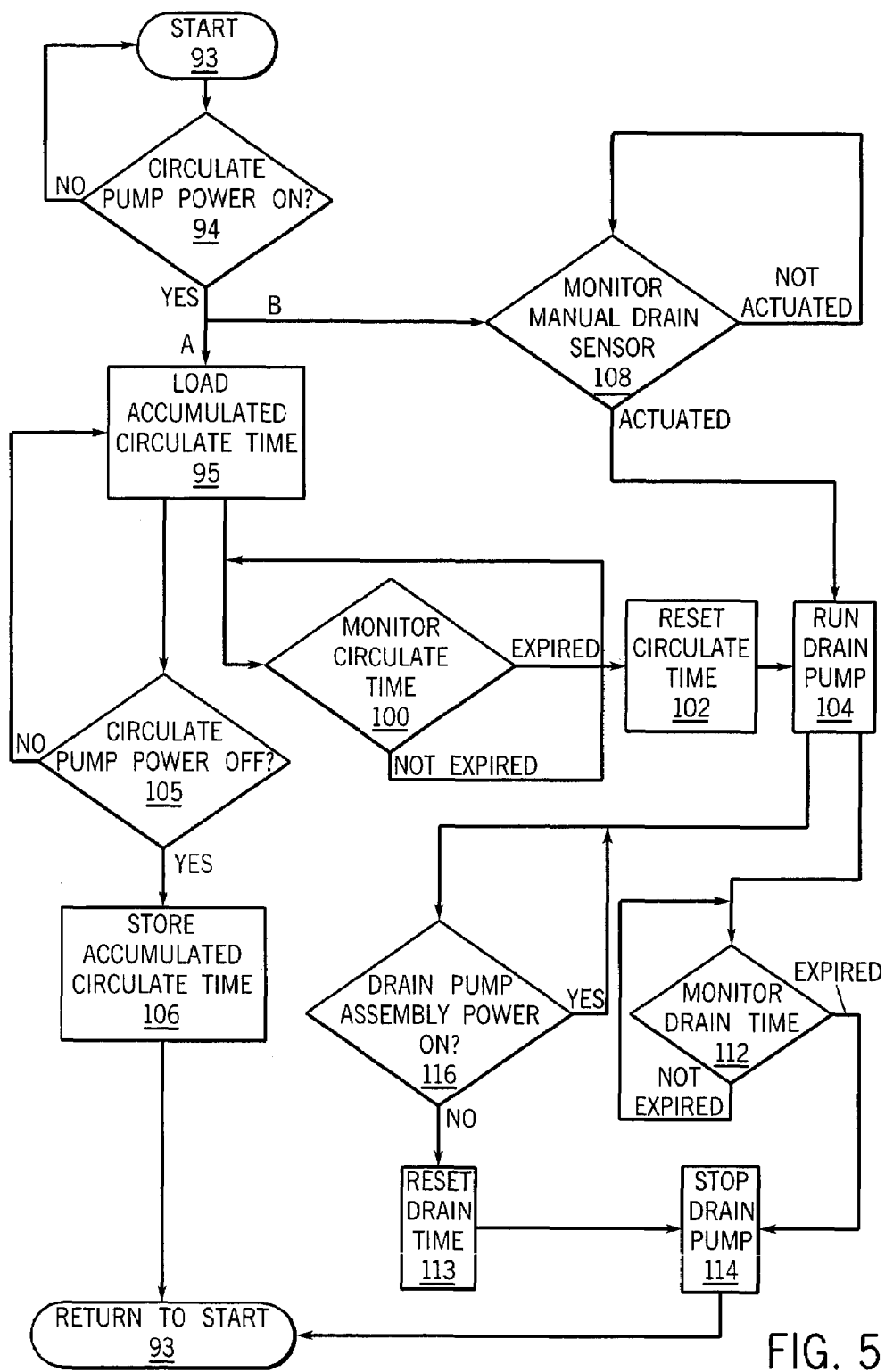
FIG. 5 depicts a logical flow diagram of the presently preferred embodiment of the drain pump controller in accordance with the invention.

FIG. 5 illustrates the steps of the logical operation of the controller 70. At the start of the operation (step 93), the processor 88 monitors the presence of power to the circulate pump to determine whether or not the circulate pump is running (step 94). As described previously, the processor 88 monitors the power to the circulate pump 44 by sensing the presence of AC power at the power interface 56 via the power converter 86. If the power to the circulate pump 44 is on (i.e., the circulate pump is running), the processor 88 proceeds on two parallel logic paths, designated A and B in FIG. 5. In path A, the processor 88 monitors the status of the circulate time to determine whether the accumulated circulate time for which the circulate pump 44 has run is equal to a predefined circulate period. In one advantageous embodiment, the circulate period corresponds to eight hours of circulate pump operation. It will be understood, however, that a manufacturer may wish to set the predefined circulate period to be a longer or shorter period, depending upon such factors as the size of the drain pump 61 and the size of the evaporative cooler 10. A suitable circulate period can be readily determined by one skilled in the art. In path B, the processor 88 monitors the status of the manual drain sensor 82 to determine whether it has been manually actuated and to run the drain pump in response to such actuation. As will be apparent to those of skill in the art, the processor 88 can be programmed using any of a variety of programming languages suitable for programming the specific processor used to implement the logic depicted in FIG. 5.

Referring to logical path A, when power is applied to the circulate pump 44, the processor 88 loads the accumulated circulate time from the data storage device 90 into a counter (step 95). This accumulated circulate time represents the accumulated time that the circulate pump 44 has run during the present circulate cycle. At the beginning of the cycle, this accumulated time is initially set to zero. After loading the accumulated circulate time, the processor 88 monitors the circulate time to determine if the circulating pump 44 has run for the entire circulate period (step 100), i.e. to determine if the circulate time is equal to or greater than the circulate period. This can be achieved by incrementing the accumulated circulate time in the counter and comparing the incremented circulate time with the circulate period. If the circulate time is less than the circulate period, the processor 88 returns to the beginning of step 100 to continue monitoring the accumulated circulate time by again incrementing it and comparing it with the circulate period. Still referring to step 100, if the circulate time is equal to or greater than the circulate period, the processor 88 resets the circulate time to zero (step 102) and turns on the drain pump (step 104) by activating the switch 84 to automatically begin the drain cycle.

Referring again to step 95, also after loading the circulate time the processor 88 again determines if power is applied to the circulate pump 44 (step 105) in a manner similar to that of step 94. If power is not applied to the circulate pump 44 (i.e., the circulate pump is off), the processor 88 stores in the data storage device 90 the accumulated circulate time (step 106), which accumulated circulate time equals the accumulated time that the circulate pump 44 has operated during the present circulate cycle. The processor 88 then returns to the start of the process (step 93) and continues to monitor the power to the circulate pump 44 to determine whether the circulate pump 44 is on or off (step 94). Referring back to step 105, if power is applied to the circulate pump 44 (i.e., the circulate pump is not off), the processor 88 returns to the beginning of step 105 and continues to monitor the power to the circulate pump 44 to determine whether the circulate pump 44 is off.

Referring again to step 94, if it is determined that the circulate pump power is on, the processor also proceeds along logic path B to monitor the status of the manual drain sensor 82 to determine whether it has been actuated (step 108). If the manual drain sensor 82 has been actuated, the processor 88 turns on the drain pump (step 104) by turning on the switch 84 to apply power to the drain pump 61.

When the processor 88 applies power to the drain pump 61, either because the circulate time has reached the circulate period (path A) or because the manual drain sensor 82 has been actuated (path B), the processor 88 then operates the drain pump 61 for the drain pump period as follows. The processor 88 monitors the drain time to determine if the drain pump 61 has run for the entire drain period (step 112), i.e. to determine if the drain time is equal to or greater than the drain period. This can be achieved by incrementing the drain time in a counter and comparing the incremented drain time with the drain period, all in a manner similar to that previously described with respect to step 100. If the drain time is less than the drain period, the processor 88 returns to the beginning of step 112 to continue monitoring the drain time by again incrementing it and comparing it with the drain period. If the drain time is equal to or greater than the drain period, the processor 88 stops the drain pump 61 (step 114) by signaling the switch 84 to open. After stopping the drain pump 61, the processor 88 then returns to the start of the process (step 93) and monitors the power to the circulate pump (step 94). Referring back to step 104, after the processor turns the switch 84 on to connect AC power to the drain pump 61, the processor 88 determines whether AC power is present at the input of the switch 84 (step 116) and is therefore available to the drain pump 61 (i.e., to determine whether the drain pump 61 is indeed on) or whether the AC power has been interrupted. If power is present (i.e., the drain pump 61 is on), the processor returns to the beginning of step 116 and continues to monitor the drain pump power. If power is not applied to the drain pump (e.g., if it has been interrupted at the power interface 56 due to a power loss), the processor 88 resets the drain time to zero (step 113) and opens the switch 84 to disconnect the AC power input from the drain pump (step 114). After opening the switch 84, the processor returns to the start of the process (step 93) and continues to monitor the power to the circulate pump (step 94). As a result of this process, whenever power to the drain pump is interrupted, the drain cycle is reset and the drain pump 61 is set to be off when the power is restored.

From the foregoing, it can be seen that the apparatus and method of the present invention possess a number of advantages. They result in improved control of an evaporative cooler drain pump and allow for manual activation of the drain cycle in an evaporative cooler, making the drain pump easier to install and test than prior drain pump systems. The apparatus and method of the present invention result in more efficient evaporative cooler water usage than prior systems provide. The evaporative cooler drain pump assembly is suitable for use with evaporative coolers of various types. The drain pump assembly is relatively simple and inexpensive to manufacture and is extremely reliable.

While certain preferred embodiments and methods of the invention have been described, these have been presented by way of example only, and are not intended to limit the scope of the present invention. Accordingly, departures may be made from such embodiments and methods, variations may be made from such conditions, and deviations may be made from the details described herein without departing from the spirit or scope of the general inventive concept as defined by the appended claims and their equivalents.

What is claimed is:

1. A drain pump assembly for use with an evaporative cooler having a water reservoir and a circulating pump, the drain pump assembly, comprising:
    a drain pump operative to pump accumulated water from the reservoir when the drain pump is turned on; and
    a controller operative to turn on the drain pump automatically after the circulating pump has operated for a predetermined circulate time period and also operative to turn on the drain pump in response to actuation of a manual drain actuator.

2. The drain pump assembly of claim 1 wherein the controller is operative to turn on the drain pump for a drain time that is equal to or greater than a predetermined drain period.

3. The drain pump assembly of claim 2 wherein:
    the controller is operative to terminate operation of the drain pump and reset the drain time after power to the circulating pump is interrupted during operation of the circulating pump.

4. The drain pump assembly of claim 1 wherein the controller comprises a processor and a data storage device operative to store data representing the accumulated circulate time when power to the circulating pump is interrupted.

5. The drain pump assembly of claim 4 wherein the data storage device comprises nonvolatile memory.

6. The drain pump assembly of claim 4 further comprising a power supply for operating the data storage device when power to the circulating pump is interrupted.

7. The drain pump assembly of claim 1 further comprising a power interface operative to simultaneously energize the drain pump assembly and the drain pump.

8. The drain pump assembly of claim 7 wherein the power interface is operative to also simultaneously energize the circulating pump.

9. The drain pump assembly of claim 1 wherein the controller includes a power converter operative to convert AC power to DC power to energize the controller.

10. The drain pump assembly of claim 8, wherein the power interface includes an AC electrical plug connector having an integrally formed electrical receptacle.

11. The drain pump assembly of claim 1 wherein the manual actuator is disposed on the exterior of a drain pump assembly housing that encloses the drain pump assembly.

12. An evaporative cooler drain pump assembly comprising:
a drain pump;
a manual drain actuator;
a controller comprising:
a power input;
a power output adapted to be coupled to a drain pump power input;
a switch having an input coupled to the power input and an output coupled to the power output and a control input;
a manual drain input coupled to the manual drain actuator;
a power interface operative to sense the application of power to the drain pump and the circulate pump; and
a processor operatively coupled to the manual drain input, the switch input and the power input, the processor being programmed to:
calculate an accumulated circulate time during which power is applied to the circulate pump;
control the switch to operate the drain pump for a predefined drain period when the accumulated circulate time is equal to or greater than a predefined circulate period;
monitor the actuation of the manual drain actuator;
control the switch to operate the drain pump for the drain period in response to actuation of the manual drain actuator; and
reset the drain time if power is removed from the drain pump during the drain pump operation.

13. The drain pump assembly of claim 12 wherein the processor is operatively coupled to a data storage device operative to store data representing the accumulated circulate time and the drain time.

14. The drain pump assembly of claim 12 wherein the data storage device comprises nonvolatile memory.

15. The drain pump assembly of claim 13 further comprising a backup power supply for operating the data storage device when power to the circulating pump is interrupted.

16. The drain pump assembly of claim 12 wherein the switch input is adapted to be coupled to an AC power source.

17. The drain pump assembly of claim 16, wherein the switch comprises a triac.

18. The drain pump assembly of claim 12, further comprising a power converter operative to convert AC power to DC power to energize the controller.

19. An evaporative cooler comprising:
a water reservoir;
a circulating pump in fluid communication with the reservoir and a water distribution system;
a drain pump operative to pump accumulated water from the reservoir when the drain pump is turned on; and
a controller operative to turn on the drain pump automatically after the circulating pump has operated for a predetermined circulate time period and also operative to turn on the drain pump in response to actuation of a manual drain actuator.

20. The evaporative cooler of claim 19 wherein the controller includes a processor programmed to:
calculate an accumulated circulate time during which power is applied to the circulate pump;
apply power to the drain pump for a drain period when the accumulated circulate time reaches a predefined circulate period;
monitor the actuation of the manual drain actuator; and
apply power to the drain pump to operate the drain pump for the drain period in response to actuation of the manual drain actuator.

21. The evaporative cooler of claim 20 wherein the processor is also programmed to reset the drain period if power is removed from the drain pump during the drain pump operation.

22. A method for controlling a drain pump of an evaporative cooler having a circulating pump, the method comprising:
calculating an accumulated circulate time for which power is applied to the circulate pump;
applying power to the drain pump for a drain period when the accumulated circulate time reaches a predefined circulate period;
monitoring actuation of a manual drain actuator; and
applying power to the drain pump in response to the actuation of the manual drain actuator.

23. The method of claim 22 wherein applying power to the drain pump in response to the actuation of the manual drain actuator further comprises applying power to the drain pump for the drain period.

24. The method of claim 22 further comprising resetting the drain period if power is removed from the drain pump during the drain pump operation.

25. The method of claim 22 further comprising storing the accumulated circulate time if power is removed from the circulating pump.

* * * * *